United States Patent
Ryu et al.

(10) Patent No.: US 8,699,241 B2
(45) Date of Patent: Apr. 15, 2014

(54) SWITCHING MODE POWER SUPPLY

(75) Inventors: Byoung Woo Ryu, Gyunggi-do (KR); Young Woon Choi, Seoul (KR); Seong Wook Choi, Daejeon (KR)

(73) Assignee: Samsung Electro-Mechanics Co., Ltd., Gyunggi-do (KR)

( * ) Notice: Subject to any disclaimer, the term of this patent is extended or adjusted under 35 U.S.C. 154(b) by 252 days.

(21) Appl. No.: 13/246,361

(22) Filed: Sep. 27, 2011

(65) Prior Publication Data

US 2012/0256491 A1 Oct. 11, 2012

(30) Foreign Application Priority Data

Apr. 11, 2011 (KR) ........................ 10-2011-0033156

(51) Int. Cl.
*H02M 3/335* (2006.01)

(52) U.S. Cl.
USPC .................... 363/21.12; 363/21.16; 363/21.18

(58) Field of Classification Search
USPC ................. 363/18, 21.04, 21.07, 27.09, 21.1, 363/21.11, 21.12, 21.15, 21.17, 21.18, 84, 363/89, 90
See application file for complete search history.

(56) References Cited

U.S. PATENT DOCUMENTS

| | | | |
|---|---|---|---|
| 2012/0069609 A1* | 3/2012 | Christophe et al. | 363/21.12 |
| 2012/0139342 A1* | 6/2012 | Bailey et al. | 307/31 |

FOREIGN PATENT DOCUMENTS

| | | | |
|---|---|---|---|
| JP | 2000-324833 A | 11/2000 | |
| KR | 10-2006-0007919 A | 1/2006 | |

OTHER PUBLICATIONS

Korean Office Action, and English translation thereof, issued in Korean Patent Application No. 10-2011-0033156 dated Jun. 18, 2012.

* cited by examiner

*Primary Examiner* — Nguyen Tran

(74) *Attorney, Agent, or Firm* — McDermott Will & Emery LLP

(57) ABSTRACT

There is provided a switching mode power supply including: a direct current (DC)/DC converting unit converting a DC power level; an auxiliary power supply unit discharged in a no load mode in which a load is not connected to an output terminal of the DC/DC converting unit; and a controlling unit sensing a change in impedance according to whether or not the load is connected to the output terminal to thereby determine whether or not the switching mode power supply is in the no load mode, and driving a pulse width modulation integrated chip (PWM IC) when a voltage level of the auxiliary power supply unit is at a preset level or less in the no load mode.

18 Claims, 3 Drawing Sheets

SWITCHING MODE POWER SUPPLY

CROSS-REFERENCE TO RELATED APPLICATIONS

This application claims the priority of Korean Patent Application No. 10-2011-0033156 filed on Apr. 11, 2011, in the Korean Intellectual Property Office, the disclosure of which is incorporated herein by reference.

BACKGROUND OF THE INVENTION

1. Field of the Invention

The present invention relates to a switching mode power supply, and more particularly, to a switching mode power supply for reducing power consumption in a no load mode.

2. Description of the Related Art

As a switching mode power supply, a switching mode type switching mode power supply (SMPS) capable of satisfying requirements such as having a small size and high efficiency is widely used. This switching mode power supply has been used in an adapter, which is an external power supply of a notebook computer, a liquid crystal display (LCD) monitor, a stereo, or the like.

An operation state of the adapter is divided into a no load mode in which a load is connected to an alternating current (AC) power source but is not connected to an output and an on mode in which the load is connected to both of the AC power source and the output. Recently, power consumption in the no load mode as well as in the on mode has been strictly regulated for the saving of energy.

As a method of reducing power consumption, the switching mode power supply according to the related art has used a burst method of repeating a process in which a switching operation is performed for a predetermined time and the switching operation is stopped for a predetermined time through feedback at the time of a light load.

However, the switching mode power supply using the burst method according to the related art has difficulty in responding to a power consumption restriction level in a no load mode, which may continuously be high.

SUMMARY OF THE INVENTION

An aspect of the present invention provides a switching mode power supply capable of significantly reducing power consumption in a no load mode.

According to an aspect of the present invention, there is provided a switching mode power supply including: a direct current (DC)/DC converting unit converting a DC power level; an auxiliary power supply unit discharged in a no load mode in which a load is not connected to an output terminal of the DC/DC converting unit; and a controlling unit sensing a change in impedance according to whether or not the load is connected to the output terminal to thereby determine whether or not the switching mode power supply is in the no load mode, and driving a pulse width modulation integrated chip (PWM IC) when a voltage level of the auxiliary power supply unit is at a preset level or less in the no load mode.

The controlling unit may include: a no load determining unit sensing the change in impedance according to whether or not the load is connected to the output terminal to thereby determine whether or not the switching mode power supply is in the no load mode; a no load controlling unit generating a level determining signal according to the voltage level of the auxiliary power supply unit; a timing signal generating unit generating a timing signal from an output signal of the no load determining unit and the level determining signal; and a PWM IC controlling unit controlling turn on/off operations of the PWM IC in response to the timing signal.

The switching mode power supply may further include a rectifying unit rectifying an alternating current (AC) voltage to thereby provide the rectified AC voltage to the DC/DC converting unit.

The no load determining unit may include: a first voltage detecting unit detecting, from the voltage level of the auxiliary power supply unit, a first detection voltage changed according to whether or not the load is connected to the output terminal; a second voltage detecting unit detecting a second detection voltage from the voltage level of the auxiliary power supply unit; and a first comparing unit comparing the first detection voltage with the second detection voltage.

The first voltage detecting unit may include a first resistor having one end connected to the auxiliary power supply unit and a second resistor having one end connected to a connection node between the other end of the first resistor and the output terminal and the other end connected to a ground, and provide a voltage at a connection node between the first and second resistors as a first detection voltage.

The second voltage detecting unit may include a third resistor having one end connected to the auxiliary power supply unit, and a fourth resistor having one end connected to the other end of the third resistor and the other end connected to the ground, and may provide a voltage at a connection node between the third and fourth resistors as a second detection voltage, and resistance values of the first to fourth resistors may be preset so that the first detection voltage is higher than the second detection voltage in the case of the no load mode.

The no load determining unit may further include a second diode having an anode connected to a non-inverting terminal of the first comparing unit and a cathode connected to the output terminal and preventing a reverse current.

The no load controlling unit may include: a reference voltage unit generating a preset reference voltage; a third voltage detecting unit detecting a third detection voltage from the voltage level of the auxiliary power supply unit; and a second comparing unit comparing the third detection voltage with the reference voltage.

The reference voltage unit may include a fifth resistor having one end connected to the auxiliary power supply unit and a first Zener diode having a cathode connected to the other end of the fifth resistor and an anode connected to the ground and provide a voltage by the first Zener diode as the reference voltage.

The third voltage detecting unit may include a sixth resistor having one end connected to the auxiliary power supply unit and a seventh resistor having one end connected to the other end of the sixth resistor and the other end connected to the ground, and may provide a voltage at a connection node between the sixth and seventh resistors as the third detection voltage.

The timing signal generating unit may include: a MICOM outputting a timing signal having a high value when at least one of the output signal of the no load determining unit and the level determining signal is a low signal; a first n-channel metal oxide semiconductor field effect transistor (MOSFET) turned on in response to the timing signal; and a photocoupler having a signal transferred thereto when the first n-channel MOSFET is turned on.

The timing signal generating unit may further include a third switching unit blocking the connection between the DC/DC converting unit and the output terminal when the timing signal is a low signal.

The third switching unit may include: an eighth resistor having one end connected to the DC/DC converting unit; a ninth resistor having one end connected to the other end of the eighth resistor; a fourth n-channel MOSFET having a gate connected to the MICOM, a drain connected to the other end of the ninth resistor, and a source connected to the ground; and a first p-channel MOSFET having a gate connected to a connection node between the eighth and ninth resistors, a drain connected to a connection node between the DC/DC converting unit and the eighth resistor, and a source connected to the output terminal.

The PWM IC controlling unit may include: a first switching unit turned off when the timing signal is a high signal; and a second switching unit turned on when the first switching unit is turned off to thereby operate the PWM IC.

The first switching unit may include: a second n-channel MOSFET having a gate receiving the timing signal, a drain connected to the second switching unit, and a source connected to the ground; a second Zener diode having a cathode connected to the gate of the second n-channel MOSFET and an anode connected to the ground; and a second capacitor connected to the gate of the second n-channel MOSFET and the ground.

The second switching unit may include: a third n-channel MOSFET having a gate connected to the drain of the second n-channel MOSFET, a drain connected to an AC power before the DC power input to the DC/DC converting unit is rectified, and a source connected to the PWM IC; a third Zener diode having an anode connected to the source of the third n-channel MOSFET and a cathode connected to the gate of the third n-channel MOSFET; and a resistor having one end connected to the cathode of the third Zener diode and the other end connected to the drain of the third n-channel MOSFET.

The auxiliary power supply unit may include a first capacitor connected between the DC/DC converting unit and the ground.

The auxiliary power supply unit may further include a first diode having an anode connected to the DC/DC converting unit and a cathode connected to the first capacitor to thereby prevent a reverse current.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE INVENTION

Figure 1:
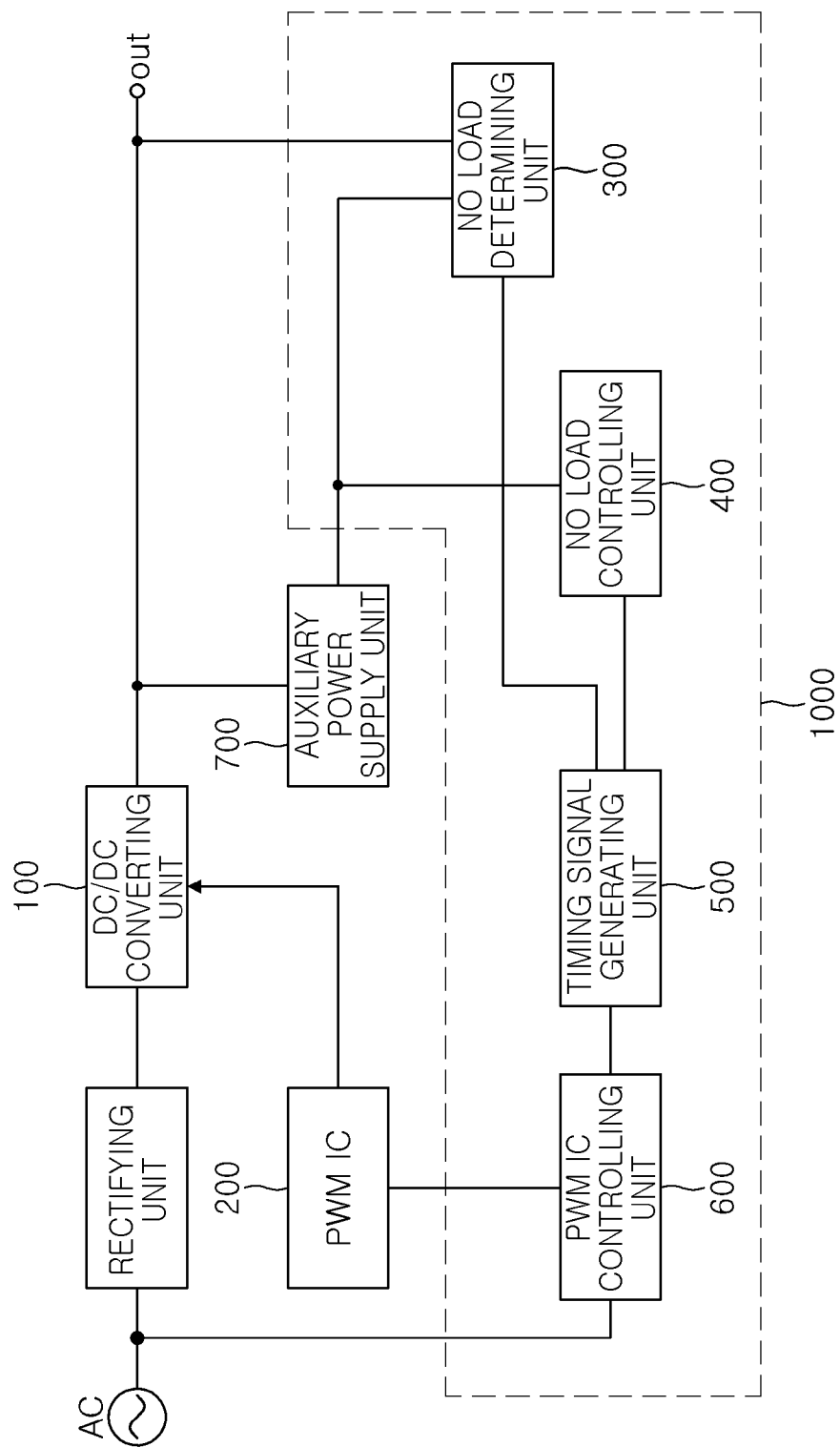
FIG. 1 is a block diagram of a switching mode power supply according to an embodiment of the present invention.

Embodiments of the present invention will now be described in detail with reference to the accompanying drawings.

The present invention should not be construed as being limited to the embodiments set forth herein and the embodiments may be used to assist in an understanding of the technical idea of the present invention. Like reference numerals designate like components having substantially the same constitution and function in the drawings of the present invention.

FIG. 1 is a block diagram of a switching mode power supply according to an embodiment of the present invention.

Referring to FIG. 1, a direct current (DC)/DC converting unit 100 may receive a DC power generated by rectifying an input normal alternating current (AC) power and convert the received DC power into a DC power having a level required for a load. Here, as the DC/DC converting unit 100, converters capable of changing a level of the DC power such as a flyback converter, a forward converter, or the like, may be used.

A pulse width modulation integrated circuit (PWM IC) 200 may change the level of the DC power by controlling a switching duty of the DC/DC converting unit 100.

An auxiliary power supply unit 700 may be discharged in a no load mode in which a load is not connected to an output terminal OUT of the DC/DC converting unit 100. In addition, the auxiliary power supply unit 700 may supply a power to a no load controlling unit 400 and a no load determining unit 300 in the no load mode.

A controlling unit 1000 may sense a change in impedance according to whether or not the load is connected to an output terminal to thereby determine whether or not the switching mode power supply is in the no load mode, and may drive the PWM IC 200 when a voltage level of the auxiliary power supply unit 700 is a preset level or less in the no load mode. Here, the controlling unit 1000 may include the no load determining unit 300, the no load controlling unit 400, a timing signal generating unit 500, and a PWM IC controlling unit 600.

The no load determining unit 300 may sense a change in impedance according to whether or not the load is connected to the output terminal OUT of the DC/DC converting unit 100 to thereby determine whether the output terminal OUT of the DC/DC converting unit 100 is in the no load mode and output a preset signal corresponding to the determination.

The no load controlling unit 400 may generate a level determining signal determining a voltage level of the auxiliary power supply unit 700 at the time of the no load mode.

The timing signal generating unit 500 may generate a timing signal determining turn on/off operations of the PWM IC 200 in response to an output signal of the no load determining unit 300 and the level determining signal.

The PWM IC controlling unit 600 may control the turn on/off operations of the PWM IC 200 in response to the timing signal.

Figure 2:
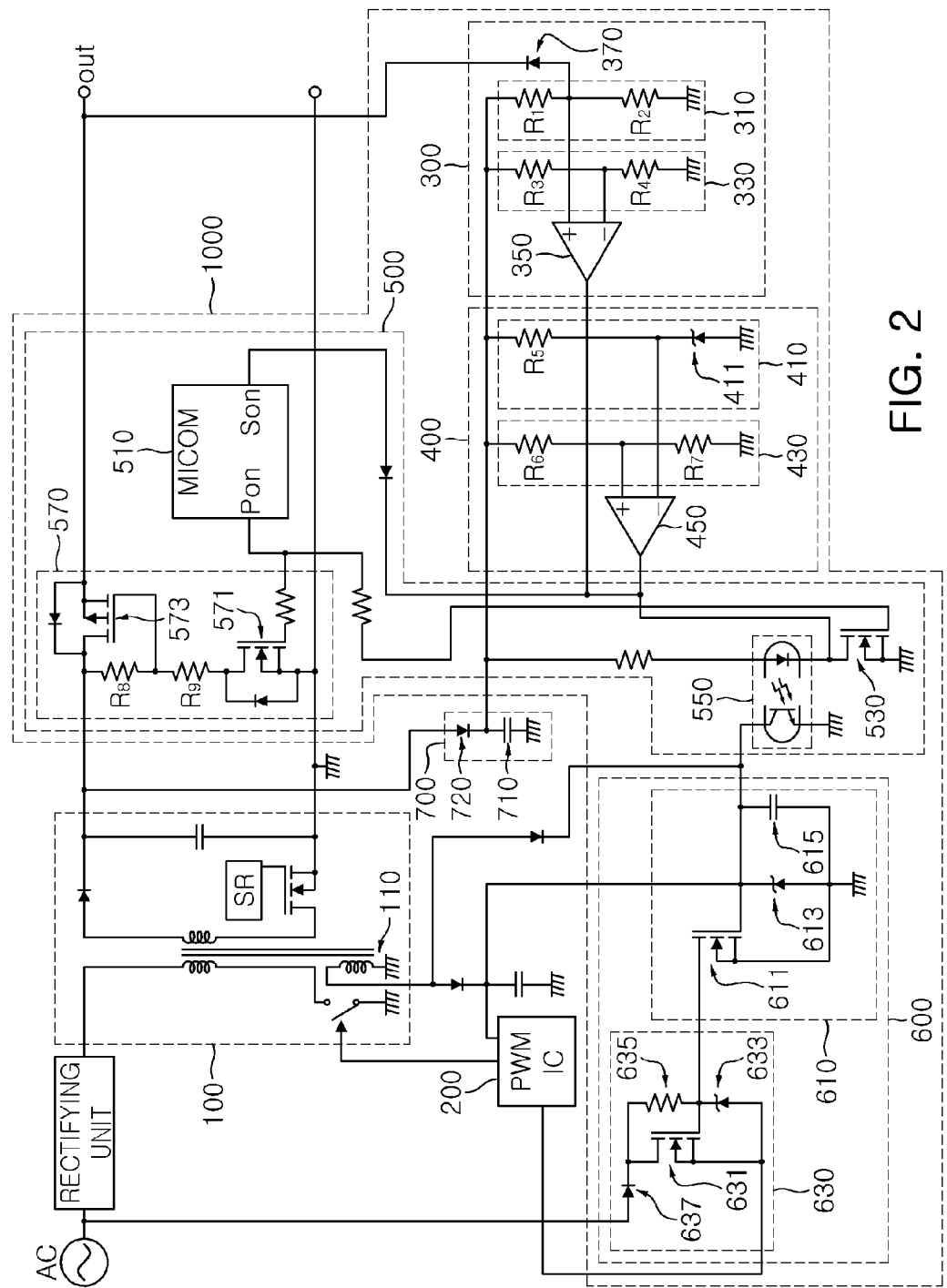
FIG. 2 is a detailed view of FIG. 1.

FIG. 2 is a detailed view of each part of FIG. 1.

Referring to FIG. 2, the DC/DC converting unit 100 may include a flyback converter that includes a primary coil having a DC power supplied thereto, a secondary coil electromagnetically coupled to the primary coil, a diode rectifying a voltage induced to the secondary coil, and a smoothing capacitor smoothing the rectified voltage.

In addition, the DC/DC converting unit 100 may include an auxiliary coil 110 capable of allowing a power to be supplied to a predetermined part of the switching mode power supply according to an embodiment of the present invention.

Here, the DC power may be a DC voltage generated by rectifying an input normal AC power by a rectifying unit including a bridge diode and the like.

The PWM IC 200 may generate a pulse determining a switching duty of the DC/DC converting unit 100. That is, a power transferred to the secondary coil may be controlled by controlling a current input to the DC/DC converting unit 100 using switching by the pulse.

The auxiliary power supply unit 700 may include a first diode 720 having an anode connected to the DC/DC converting unit 100 and preventing a reverse current, and a first capacitor 710 connected between a cathode of the first diode 720 and a ground and charged and discharged in the no load mode.

The controlling unit 1000 may include the no load determining unit 300, the no load controlling unit 400, the timing signal generating unit 500, and the PWM IC controlling unit 600.

The no load determining unit 300 may sense a change in impedance according to whether or not the load is connected to the output terminal OUT to thereby determine whether or not the output terminal OUT is in the no load mode. More specifically, the no load determining unit 300 may include a first voltage detecting unit 310 connected among the auxiliary power supply unit 700, the output terminal OUT, and a ground to thereby detect a voltage, an second voltage detecting unit 330 connected between the auxiliary power supply unit 700 and the ground to thereby detect a voltage, and a first comparing unit 350 having a non-inverting terminal receiving the voltage detected in the first voltage detecting unit 310 and an inverting terminal receiving the voltage detected in the second voltage detecting unit 330.

More specifically, the first voltage detecting unit 310 may include a first resistor R1 having one end connected to the auxiliary power supply unit 700 and a second resistor R2 having one end connected to a connection node between the other end of the first resistor R1 and the output terminal OUT and the other end connected to the ground. The second voltage detecting unit 330 may include a third resistor R3 having one end connected to the auxiliary power supply unit 700 and a fourth resistor R4 having one end connected to the other end of the third resistor R3 and the other end connected to the ground. In addition, the no load determining unit 300 may include a second diode 370 having an anode connected to the non-inverting terminal of the first comparing unit 350 and a cathode connected to the output terminal OUT in order to prevent a reverse current from the output terminal OUT. In the case of the no load mode, the no load determining unit 300 may set the first to fourth resistors so that the voltage detected in the first voltage detecting unit 310 is higher than the voltage detected in the second voltage detecting unit 330.

The no load controlling unit 400 may generate the level determining signal according to a voltage level of the auxiliary power supply unit 700 in the no load mode and generate a constant signal in an on mode. More specifically, the no load controlling unit 400 may include a reference voltage unit 410 supplying a preset voltage, a third voltage detecting unit 430 connected between the auxiliary power supply unit 700 and the ground to thereby detect a voltage, and a second comparing unit 450 having an inverting terminal connected to the reference voltage unit 410 and a non-inverting terminal connected to the third voltage detecting unit.

More specifically, the reference voltage unit 410 may include a fifth resistor R5 having one end connected to the auxiliary power supply unit 700 and a first Zener diode 411 having a cathode connected to the other end of the fifth resistor R5 and an anode connected to the ground.

In addition, the third voltage detecting unit 430 may include a sixth resistor R6 having one end connected to the auxiliary power supply unit 700 and a seventh resistor R7 having one end connected to the other end of the sixth resistor R6 and the other end connected to the ground.

The timing signal generating unit 500 may generate the timing signal determining the turn on/off operations of the PWM IC 200 in response to the output signal of the no load determining unit 300 and the level determining signal of the no load controlling unit 400. More specifically, the timing signal generating unit 500 may include a MICOM 510 outputting a timing signal having a high (H) signal value when at least one of the output signal of the no load determining unit 300 and the level determining signal is a low (L) signal, a first n-channel metal oxide semiconductor field effect transistor (MOSFET) 530 turned on in response to the timing signal, and a photocoupler 550 having a signal transferred thereto when the first n-channel MOSFET 530 is turned on.

In addition, the timing signal generating unit 500 may further include a third switching unit 570 blocking connection between the DC/DC converting unit 100 and the output terminal OUT when the timing signal is a low (L) signal. More specifically, the third switching unit 570 may include an eighth resistor R8 having one end connected to the DC/DC converting unit 100, a ninth resistor R9 having one end connected to the other end of the eighth resistor R8, a fourth n-channel MOSFET 571 having a gate connected to the MICOM 510, a drain connected to the other end of the ninth resistor R9, and a source connected to the ground, and a first p-channel MOSFET 573 having a gate connected to a connection node between the eighth and ninth resistors R8 and R9, a drain connected to a connection node between the DC/DC converting unit 100 and the eighth resistor R8, and a source connected to the output terminal OUT.

The PWM IC controlling unit 600 may include a first switching unit 610 turned off when the timing signal is a high (H) signal and a second switching unit 630 turned on when the first switching unit is turned off to thereby operate the PWM IC 200.

The first switching unit 610 may include a second n-channel MOSFET 611 having a gate having the timing signal transferred thereto through the photocoupler 550, a drain connected to the second switching unit 630, a source connected to the ground, a second Zener diode 613 having a cathode connected to the gate of the second n-channel MOSFET 611 and an anode connected to the ground, and a second capacitor 619 connected between the gate of the second n-channel MOSFET 611 and the ground.

In addition, the second switching unit 630 may include a third n-channel MOSFET 631 having a gate connected to the drain of the second n-channel MOSFET 611, a drain connected to an AC power before the DC power input to the DC/DC converting unit 100 is rectified, and a source connected to the PWM IC 200, a third Zener diode 633 having an anode connected to the source of the third n-channel MOSFET 631 and a cathode connected to the gate of the third n-channel MOSFET, and a resistor 635 having one end connected to the cathode of the third Zener diode 633 and the other end connected to the drain of the third n-channel MOSFET 631.

In addition, the PWM IC controlling unit 600 may include a third diode 637 having an anode connected to the AC power and a cathode connected to the drain of the third n-channel MOSFET 631 and rectifying the AC power.

Figure 3:
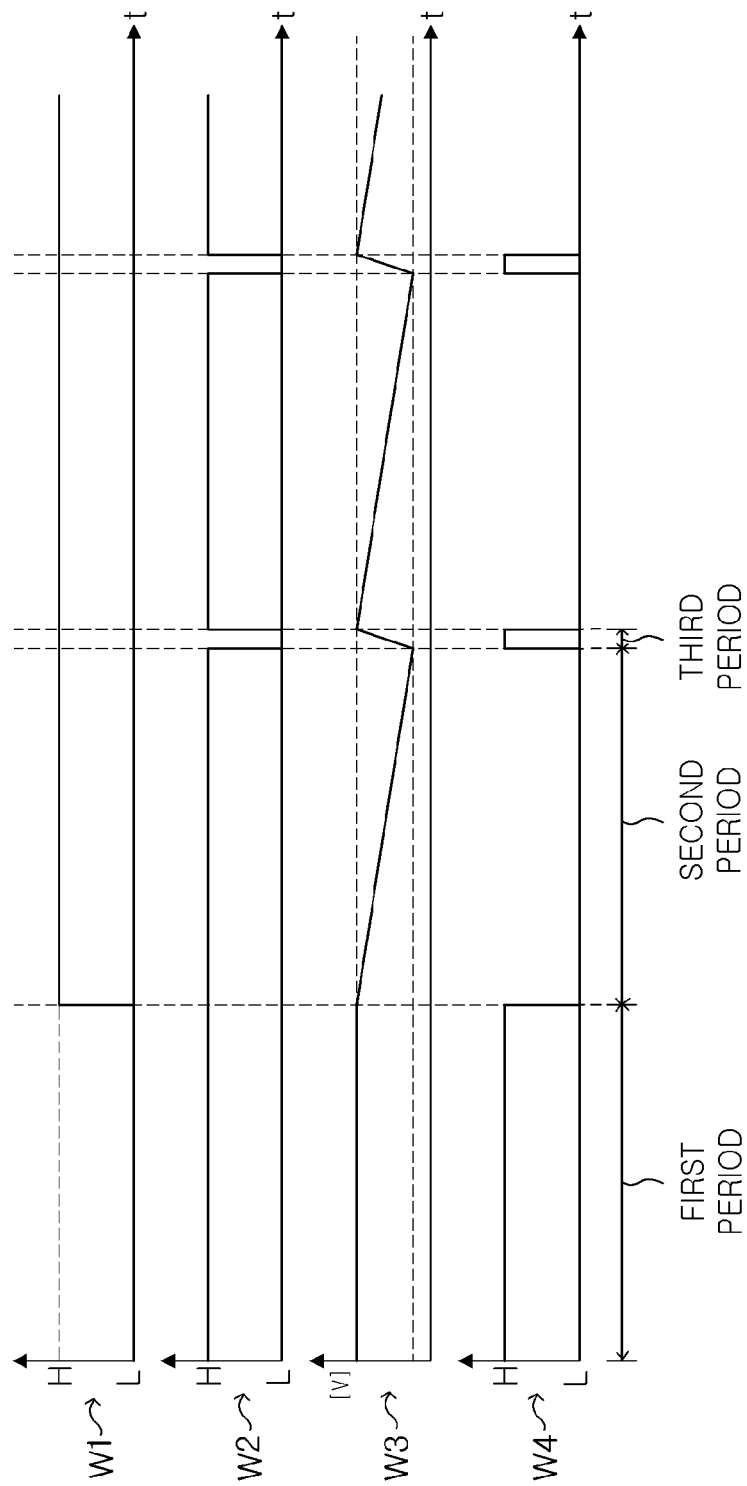
FIG. 3 is a timing chart showing waveforms of respective parts in FIGS. 1 and 2.

FIG. 3 is a timing chart showing waveforms of respective parts in FIGS. 1 and 2.

Referring to FIG. 3, W1 indicates a signal generated in the no load determining unit 300, and W2 indicates a level determining signal, which is a signal generated in the no load controlling unit 400. Here, a vertical axis indicates a high (H) signal or a low (L) signal.

W3 indicates a waveform showing a change in voltage in the auxiliary power supply unit 700.

W4 indicates a waveform showing a timing signal, that is, whether or not the PWM IC 200 is operated. Here, a high (H) signal represents that the PWM IC 200 is operated and a low (L) signal represents that the PWM IC 200 is stopped.

Hereinafter, the operations and effects according to the embodiment of the present invention will be described in detail with reference to the accompanying drawings.

FIG. 1 is a block diagram of a switching mode power supply according to an embodiment of the present invention.

Referring to FIG. 1, the DC/DC converting unit 100 may receive a DC power generated by rectifying a normal AC power and convert the received DC power into a DC power having a level required for a load.

The PWM IC 200 may change a level of the DC power by controlling a current input to the DC/DC converting unit 100. That is, the PWM IC 200 should be operated in order that the power transfer is performed in the DC/DC converting unit 100.

The auxiliary power supply unit 700 may be charged or discharged in the no load mode. In addition, the auxiliary power supply unit 700 may supply a power to the no load determining unit 300 and the no load controlling unit 400 in the no load mode.

That is, the auxiliary power supply unit 700 may be continuously maintained in a charged state in the on mode and be discharged while providing a voltage to the no load determining unit 300 and the no load controlling unit 400 in the no load mode.

The no load determining unit 300 may sense a change in impedance according to whether or not the load is connected to the output terminal OUT of the DC/DC converting unit 100 to thereby determine whether the output terminal OUT of the DC/DC converting unit 100 is in the no load mode, and may output a signal corresponding to the determination.

The no load controlling unit 400 may generate a level determining signal determining a voltage level of the auxiliary power supply unit 700. That is, the no load controlling unit 400 may determine whether the voltage level of the auxiliary power supply unit 700 is lower than a preset voltage level to thereby generate the level determining signal according to the determination.

The timing signal generating unit 500 may generate a timing signal determining the timing of turn on/off operations of the PWM IC 200 in response to an output signal of the no load determining unit 300 and the level determining signal.

The PWM IC controlling unit 600 may control the turn on/off operations of the PWM IC 200 in response to the timing signal from the timing signal generating unit 500.

FIG. 2 is a detailed view of FIG. 1.

Referring to FIG. 2, in the DC/DC converting unit 100, the DC power generated by rectifying the normal AC power may be supplied to the primary coil in a pulse form by a switching operation of the primary coil. The DC power may be transferred to the secondary coil by an electromagnetic induction phenomenon. This transferred power may be rectified through a diode and smoothed through the third diode 637 to thereby be output in a form in which it is closer to a DC.

The PWM IC 200 generates a pulse controlling a switching duty of the primary coil of the DC/DC converting unit 100. This pulse may control a power transferred to the secondary coil by controlling a current input to the DC/DC converting unit 100. Therefore, when the PWM IC 200 is stopped, the DC/DC converting unit 100 may not transfer the power to the secondary coil.

The auxiliary power supply unit 700 may be discharged in the no load mode. In addition, the auxiliary power supply unit 700 may supply a power to the no load controlling unit 400 and the no load determining unit 300 in the no load mode. That is, the auxiliary power supply unit 700 may be continuously maintained in a charged state in the on mode and be discharged while providing a voltage to the no load determining unit 300 and the no load controlling unit 400 in the case in which the PWM IC 200 is not operated in the no load mode.

The no load determining unit 300 may sense a change in impedance according to whether or not the load is connected to the output terminal OUT to thereby determine whether or not the output terminal OUT is in the no load mode, and include the first voltage detecting unit 310, the second voltage detecting unit 330, and the first comparing unit 350.

The first voltage detecting unit 310 may detect a voltage input to the non-inverting terminal of the first comparing unit 350 from a voltage at a node connected to the auxiliary power supply unit 700 by a voltage divider rule. In addition, the second voltage detecting unit 330 may also detect a voltage input to the inverting terminal of the first comparing unit 350 from a voltage at a node connected to the auxiliary power supply unit 700 by the voltage divider rule.

Here, a connection node between the first resistor R1 and the second resistor R2 of the first voltage detecting unit 310 may be connected to the output terminal OUT. Therefore, the second resistor R2 may be connected in parallel with a resistor of the load in the on mode, such that a voltage detected in the first voltage detecting unit 310 in the on mode may become different from a voltage detected in the first voltage detecting unit 310 in the no load mode. Resistance values of the first to fourth resistors may be preset so that the voltage detected in the first voltage detecting unit 310 is higher than a voltage detected in the second voltage detecting unit 330, in the no load mode, in consideration of approximate impedance of the load connected to the output terminal OUT.

That is, the voltage detected in the first voltage detecting unit 310, which is an input to the non-inverting terminal of the first comparing unit 350, is higher than the voltage detected in the second voltage detecting unit 330, which is an input to the inverting terminal of the first comparing unit 350 in the no load mode, such that an output of the first comparing unit 350 becomes a high (H) signal. In addition, an output of the first comparing unit 350 becomes a low (L) signal in the on mode.

The no load controlling unit 400 may determine a discharging level of the auxiliary power supply unit 700 to thereby generate a level determining signal, in the no load mode. The no load controlling unit 400 may include the reference voltage unit 410, the third voltage detecting unit 430, and the second comparing unit 450.

The reference voltage unit 410 may supply a reference voltage to the inverting terminal of the second comparing unit 450 and may include the fifth resistor R5 connected to the auxiliary power supply unit 700 and the first Zener diode 411 connected in series with the fifth resistor R5. Here, a voltage of the auxiliary power supply unit 700 may be changed in the no load mode. Even in this case, a comparative constant reference voltage may be supplied to the inverting terminal of the second comparing unit 450.

The third voltage detecting unit 430 may include the sixth resistor R6 and the seventh resistor R7 that are connected in series between the auxiliary power supply unit 700 and the ground. Therefore, the voltage of the auxiliary power supply unit 700 may be divided by the voltage divider rule, such that the divided voltage is input to the non-inverting terminal of the second comparing unit 450. Since a third detection voltage is detected from the voltage of the auxiliary power supply unit 700, when the auxiliary power supply unit 700 is discharged, such that a level of the voltage of the auxiliary power supply unit 700 becomes low, the third detection voltage may also become low.

The second comparing unit 450 may compare a reference voltage input to the inverting terminal thereof with the third detection voltage input to the non-inverting terminal thereof to thereby output a level determining signal.

As described above, in the no load mode, the reference voltage may be almost constantly maintained; however, the third detection voltage may be reduced according to the discharging of the auxiliary power supply unit 700. When the third detection voltage becomes lower than the reference voltage, a low (L) signal may be output. In the on mode, the voltage level of the auxiliary power supply unit 700 may be almost unchanged, such that the third detection voltage is continuously higher than the reference voltage. Therefore, the level determining signal may become a high (H) signal.

That is, the level determining signal may become a high (H) signal in the on mode; however, it may become a high (H) signal before the third detection voltage detected from the auxiliary power supply unit 700 becomes lower than the reference voltage and may become a low (L) signal when the third detection voltage is lower than the reference voltage in the no load mode.

The timing signal generating unit 500 may receive the output signal of the no load determining unit 300 and the level determining signal of the no load controlling unit 400 to thereby generate a timing signal. More specifically, when at least one of the output signal of the no load determining unit 300 and the level determining signal of the no load controlling unit 400 is a low (L) signal, a high (H) signal is generated in the MICOM 510. The high (H) signal generated in the MICOM 510 is input to the gate of the first n-channel MOSFET 530. Therefore, the first n-channel MOSFET 530 is turned on, such that the timing signal may be transferred to the PWM IC controlling unit 600 of a primary side through the photocoupler 550.

In addition, the timing signal generating unit 500 may further include the third switching unit 570 blocking the connection between the DC/DC converting unit 100 and the output terminal OUT when the timing signal is a low (L) signal. More specifically, when both of the output signal of the no load determining unit 300 and the level determining signal of the no load controlling unit 400 are high (H) signals, the MICOM 510 may generate a low (L) signal. At this time, the fourth n-channel MOSFET 571 may be turned off and an output voltage of the DC/DC converting unit 100 may not be divided by the eighth resistor R8 and the ninth resistor R9, such that the first p-channel MOSFET 573 is turned off. Therefore, the connection between the DC/DC converting unit 100 and the output terminal OUT may be blocked.

In brief, in the on mode, the output signal of the no load determining unit 300 is a low (L) signal and the level determining signal is a high (H) signal, such that the timing signal becomes a high (H) signal. In the no load mode, a no load determining signal is continuously a high (H) signal, such that the timing signal becomes a low (L) signal during a time in which the level output signal is a high (H) signal and the timing signal becomes a high (H) signal during a time in which the level output signal is a low (L) signal. In addition, when the timing signal is a high (H) signal, the DC/DC converting unit 100 may be connected to the output terminal OUT, and when the timing signal is a low (L) signal, the connection between the DC/DC converting unit 100 and the output terminal OUT may be blocked.

The PWM IC controlling unit 600 may control the turn on/off operations of the PWM IC 200 in response to the timing signal. That is, the PWM IC controlling unit 600 may operate the PWM IC 200 when the timing signal is a high (H) signal and stop the PWM IC 200 when the timing signal is a low (L) signal. The PWM IC controlling unit 600 may include the first switching unit 610 receiving the timing signal and the second switching unit 630 connected to the PWM IC 200.

When the timing signal generated in the timing signal generating unit 500 is a high (H) signal, a gate potential of the second n-channel MOS FET 611 maintained as a constant voltage by the second Zener diode 613 may become the same as a ground potential. Therefore, the second n-channel MOSFET 611 may be turned off. In this case, a gate potential of the third n-channel MOSFET 631 of the second switching unit 630 may become a threshold voltage or more by the third Zener diode 633, such that the third n-channel MOSFET 631 is turned on. Then, the AC power may be rectified and input into the PWM IC 200. Therefore, the PWM IC 200 may receive the power from the auxiliary coil 110 of the DC/DC converting unit 100 to thereby be operated, such that the DC/DC converting unit 100 may supply the converted DC power to the output terminal OUT according to a switching duty.

A case in which the timing signal, which is a low (L) signal, is input in the no load mode will be described. The timing signal may be the low (L) signal, such that the first n-channel MOSFET 611 is turned off, whereby a photodiode of the photocoupler 550 may not generate an optical signal. Therefore, a bipolar junction transistor of the photocoupler 550 may be turned off, and the gate potential of the second n-channel MOSFET of the first switching unit 610 may be maintained as a constant value by the second Zener diode 613, such that the second n-channel MOSFET is turned on. In this case, the gate of the third n-channel MOSFET of the second switching unit 630 may be connected to the ground through the second n-channel MOSFET 611, such that the third n-channel MOSFET 631 is turned off. Therefore, the AC power rectified into the DC power may not be input to the PWM IC 200, such that the PWM IC 200 may not be operated. As a result, the DC/DC converting unit 100 may not also be operated.

As described above, the PWM IC controlling unit 600 may normally operate the PWM IC 200 in the on mode and may intermittently operate the PWM IC 200 in the no load mode, in response to the timing signal, such that the power consumption may be reduced in the no load mode.

FIG. 3 is a timing chart showing waveforms of respective parts in FIGS. 1 and 2.

Referring to FIGS. 2 and 3, W1 indicates a signal generated in the no load determining unit 300, and W2 indicates a level determining signal of the no load controlling unit 400. W3 indicates a waveform showing a change in voltage in the auxiliary power supply unit 700. W4 indicates a waveform showing a timing signal, that is, whether or not the PWM IC 200 is operated. Here, a high (H) signal represents that the PWM IC 200 is operated and a low (L) signal represents that the PWM IC 200 is stopped.

A first period represents the on mode. In this period, the output signal of the no load determining unit 300 may be a low (L) signal and the level determining signal may be a high (H) signal, such that the timing signal becomes a high (H) signal. The first switching unit 610 of the PWM IC controlling unit 600 may be turned off and the second switching unit 630 thereof may be turned on, such that the PWM IC 200 may be operated. At this time, since the PWM IC 200 is continuously operated, the first capacitor 710 of the auxiliary power supply unit 700 may maintain a charged voltage.

A second period and periods after the second period represents the no load mode. The output signal of the no load determining unit 300 may become a continuously high (H) signal in the no load mode.

The second period represents that a voltage of the auxiliary power supply unit 700 is reduced in the no load mode. In this period, the level determining signal may be a high (H) signal, such that the timing signal is a low (L) signal. Therefore, the first switching unit 610 of the PWM IC controlling unit 600 may be turned on and the second switch thereof may be turned off, such that the PWM IC 200 is not operated.

A third period represents that the PWM IC 200 is temporally operated in the no load mode. When the voltage of the auxiliary power supply unit 700 is reduced, such that the third detection voltage of the no load controlling unit 400 becomes lower than the reference voltage, the level determining signal may become a low (L) signal. At this time, the timing signal may become a high (H) signal. Therefore, the PWM IC controlling unit 600 may operate the PWM IC 200, such that the DC/DC converting unit 100 is operated. In addition, the first capacitor 710 may be rapidly charged.

After the third period, a no load state may be continued, such that the above-mentioned second and third periods are repeated. Therefore, in the case of the switching mode power supply according to the embodiment of the present invention, in the no load mode, the PWM IC 200 may be operated only in a short time in which the first capacitor 710 is charged and the operation thereof is stopped during most of the time, such that the operation of the DC/DC converting unit 100 is stopped. This operation control may be performed, such that power consumption in the no load mode may be significantly reduced, as compared to the related art.

As set forth above, according to the embodiment of the present invention, the power consumption in the no load mode can be significantly reduced. Particularly, according to the embodiment of the present invention, a consumption power at 230 V and 50 Hz for 1 hour may be about 20 mW. As a result, the power consumption in the no load mode can be reduced to 1/10 or less, as compared to the related art.

While the present invention has been shown and described in connection with the embodiments, it will be apparent to those skilled in the art that modifications and variations can be made without departing from the spirit and scope of the invention as defined by the appended claims.

What is claimed is:

1. A switching mode power supply comprising:
   a direct current (DC)/DC converting unit converting a DC power level;
   an auxiliary power supply unit discharged in a no load mode in which a load is not connected to an output terminal of the DC/DC converting unit; and
   a controlling unit sensing a change in impedance according to whether or not the load is connected to the output terminal to thereby determine whether or not the switching mode power supply is in the no load mode, generating a timing signal in response to a sensing signal generated according to a no load mode determination and a level determining signal generated according to the voltage level of the auxiliary power supply unit in the no load mode, and controlling turn on/off operations of a pulse width modulation integrated chip (PWM IC) in response to the timing signal.

2. The switching mode power supply of claim 1, wherein the controlling unit includes:
   a no load determining unit sensing the change in impedance according to whether or not the load is connected to the output terminal to thereby determine whether or not the switching mode power supply is in the no load mode and output the sensing signal;
   a no load controlling unit generating the level determining signal according to the voltage level of the auxiliary power supply unit;
   a timing signal generating unit generating the timing signal in response to the sensing signal and the level determining signal; and
   a PWM IC controlling unit controlling the turn on/off operations of the PWM IC in response to the timing signal.

3. The switching mode power supply of claim 1, further comprising a rectifying unit rectifying an alternating current (AC) voltage to thereby provide the rectified AC voltage to the DC/DC converting unit.

4. The switching mode power supply of claim 2, wherein the no load determining unit includes:
   a first voltage detecting unit detecting, from the voltage level of the auxiliary power supply unit, a first detection voltage changed according to whether or not the load is connected to the output terminal;
   a second voltage detecting unit detecting a second detection voltage from the voltage level of the auxiliary power supply unit; and
   a first comparing unit comparing the first detection voltage with the second detection voltage.

5. The switching mode power supply of claim 2, wherein the no load controlling unit includes:
   a reference voltage unit generating a preset reference voltage;
   a third voltage detecting unit detecting a third detection voltage from the voltage level of the auxiliary power supply unit; and
   a second comparing unit comparing the third detection voltage with the reference voltage.

6. The switching mode power supply of claim 2, wherein the timing signal generating unit includes:
   a MICOM outputting a timing signal having a high value when at least one of the output signal of the no load determining unit and the level determining signal is a low signal;
   a first n-channel metal oxide semiconductor field effect transistor (MOSFET) turned on in response to the timing signal; and
   a photocoupler having a signal transferred thereto when the first n-channel MOSFET is turned on.

7. The switching mode power supply of claim 2, wherein the PWM IC controlling unit includes:
   a first switching unit turned off when the timing signal is a high signal; and
   a second switching unit turned on when the first switching unit is turned off to thereby operate the PWM IC.

8. The switching mode power supply of claim 1, wherein the auxiliary power supply unit includes a first capacitor connected between the DC/DC converting unit and a ground.

9. The switching mode power supply of claim 8, wherein the auxiliary power supply unit further includes a first diode having an anode connected to the DC/DC converting unit and a cathode connected to the first capacitor to thereby prevent a reverse current.

10. The switching mode power supply of claim 4, wherein the first voltage detecting unit includes: a first resistor having one end connected to the auxiliary power supply unit, and a second resistor having one end connected to a connection node between the other end of the first resistor and the output terminal and the other end connected to the ground, the first voltage detecting unit providing a voltage at a connection node between the first and second resistors as a first detection voltage.

11. The switching mode power supply of claim 10, wherein the second voltage detecting unit includes a third resistor having one end connected to the auxiliary power supply unit, and a fourth resistor having one end connected to the other end of the third resistor and the other end connected to the ground, the second voltage detecting unit providing a voltage at a connection node between the third and fourth resistors as a second detection voltage, and resistance values of the first to fourth resistors are preset so that the first detection voltage is higher than the second detection voltage in the case of the no load mode.

12. The switching mode power supply of claim 4, wherein the no load determining unit further includes a second diode having an anode connected to a non-inverting terminal of the first comparing unit and a cathode connected to the output terminal and preventing a reverse current.

13. The switching mode power supply of claim 5, wherein the reference voltage unit includes a fifth resistor having one end connected to the auxiliary power supply unit, and a first Zener diode having a cathode connected to the other end of the fifth resistor and an anode connected to the ground, the reference voltage unit providing a voltage by the first Zener diode as the reference voltage.

14. The switching mode power supply of claim 5, wherein the third voltage detecting unit includes a sixth resistor having one end connected to the auxiliary power supply unit, and a seventh resistor having one end connected to the other end of the sixth resistor and the other end connected to the ground, the third voltage detecting unit providing a voltage at a connection node between the sixth and seventh resistors as the third detection voltage.

15. The switching mode power supply of claim 7, wherein the first switching unit includes: a second n-channel MOSFET having a gate receiving the timing signal, a drain connected to the second switching unit, and a source connected to the ground;

a second Zener diode having a cathode connected to the gate of the second n-channel MOSFET and an anode connected to the ground; and a second capacitor connected to the gate of the second n-channel MOSFET and the ground.

16. The switching mode power supply of claim 15, wherein the second switching unit includes:

a third n-channel MOSFET having a gate connected to the drain of the second n-channel MOSFET, a drain connected to an AC power before the DC power input to the DC/DC converting unit is rectified, and a source connected to the PWM IC;

a third Zener diode having an anode connected to the source of the third n-channel MOSFET and a cathode connected to the gate of the third n-channel MOSFET; and a resistor having one end connected to the cathode of the third Zener diode and the other end connected to the drain of the third n-channel MOSFET.

17. The switching mode power supply of claim 6, wherein the timing signal generating unit further includes a third switching unit blocking the connection between the DC/DC converting unit and the output terminal when the timing signal is a low signal.

18. The switching mode power supply of claim 17, wherein the third switching unit includes:

an eighth resistor having one end connected to the DC/DC converting unit;

a ninth resistor having one end connected to the other end of the eighth resistor;

a fourth n-channel MOSFET having a gate connected to the MICOM, a drain connected to the other end of the ninth resistor, and a source connected to the ground; and a first p-channel MOSFET having a gate connected to a connection node between the eighth and ninth resistors, a drain connected to a connection node between the DC/DC converting unit and the eighth resistor, and a source connected to the output terminal.

* * * * *